United States Patent
Chen et al.

(10) Patent No.: US 9,575,255 B2
(45) Date of Patent: Feb. 21, 2017

(54) WAVELENGTH DIVISION MULTIPLEXER ARRAY

(71) Applicant: FINISAR CORPORATION, Sunnyvale, CA (US)

(72) Inventors: Xiaolin Chen, Shanghai (CN); Xucheng Wang, Shanghai (CN); Fan Chen, Shanghai (CN); Steven James Frisken, Vaucluse (AU)

(73) Assignee: FINISAR CORPORATION, Sunnyvale, CA (US)

( * ) Notice: Subject to any disclaimer, the term of this patent is extended or adjusted under 35 U.S.C. 154(b) by 480 days.

(21) Appl. No.: 14/146,462

(22) Filed: Jan. 2, 2014

(65) Prior Publication Data

US 2015/0334475 A1  Nov. 19, 2015

(30) Foreign Application Priority Data

Oct. 10, 2013  (CN) .......................... 2013 1 0470703

(51) Int. Cl.
| | |
|---|---|
| *G02B 6/26* | (2006.01) |
| *G02B 6/32* | (2006.01) |
| *G02B 6/28* | (2006.01) |
| *H04Q 11/00* | (2006.01) |
| *H04J 14/02* | (2006.01) |

(Continued)

(52) U.S. Cl.
CPC ........ *G02B 6/2938* (2013.01); *G01M 11/3136* (2013.01); *G01M 11/3154* (2013.01); *G02B 6/32* (2013.01); *G02B 6/35* (2013.01); *G02B 6/354* (2013.01); *H04B 10/07* (2013.01); *H04J 14/02* (2013.01); *H04Q 11/0005* (2013.01); *G02B 6/29361* (2013.01); *H04Q 2011/0009* (2013.01); *H04Q 2011/0016* (2013.01)

(58) Field of Classification Search
CPC .............. G02B 6/2938; G02B 6/29361; G02B 6/29368; G02B 6/32; G02B 6/35; G02B 6/354; G01M 11/3136; G01M 11/3154; H04B 10/07; H04Q 2011/0009; H04Q 2011/0016; H04Q 11/0005; H04J 14/02
USPC .. 385/16, 18, 22, 24, 31, 33, 39, 47; 398/43, 45, 46, 79, 82, 83, 85
See application file for complete search history.

(56) References Cited

U.S. PATENT DOCUMENTS 4,867,520 A * 9/1989 Weidel ............... G02B 6/29368
  385/24
7,142,749 B2  11/2006 Morey et al.
(Continued)

FOREIGN PATENT DOCUMENTS

WO  2013/016758 A1  2/2013

OTHER PUBLICATIONS

Barnoski, M.K. et al., "Fiber waveguides: a novel technique for investigating attenuation characteristics," Applied Optics, vol. 15, No. 9, Sep. 1976, pp. 2112-2115.

(Continued)

*Primary Examiner* — Akm Enayet Ullah
*Assistant Examiner* — Michael Mooney
(74) *Attorney, Agent, or Firm* — Maschoff Brennan

(57) ABSTRACT

In an example embodiment, a WDM array includes an optical filter, N common ports, N reflection ports, and N pass ports. The N common ports may be positioned to a first side of the optical filter. N may be greater than or equal to two. The N reflection ports may be positioned to the first side of the optical filter. The N pass ports may be positioned to a second side of the optical filter opposite the first side.

20 Claims, 6 Drawing Sheets

(51) Int. Cl.
      G02B 6/293      (2006.01)
      G02B 6/35       (2006.01)
      H04B 10/07      (2013.01)
      G01M 11/00      (2006.01)

(56) References Cited

U.S. PATENT DOCUMENTS 7,468,840 B2 * 12/2008 Cohen .................... G02B 6/272
                                                                                         349/196
2012/0236216 A1     9/2012 Sharma et al.

OTHER PUBLICATIONS

International Search Report and Written Opinion of the International Searching Authority dated Jan. 14, 2015 as received in Application No. PCT/US2014/60144 (13 pgs).

* cited by examiner

WAVELENGTH DIVISION MULTIPLEXER ARRAY

FIELD

Embodiments described herein generally relate to wavelength division multiplexer (WDM) arrays.

BACKGROUND

Unless otherwise indicated herein, the materials described herein are not prior art to the claims in the present application and are not admitted to be prior art by inclusion in this section.

Thin film filter-based wavelength division multiplexers (WDMs) are widely used in optical communication systems. Such WDMs may be implemented as a three-port component, including a common port, a reflection port, and a pass port, and may include a thin film filter, a dual fiber collimator, and a single fiber collimator. Some applications may call for multiple WDMs, or a WDM array. Replicating such three-port WDMs as described above for use in a WDM array may be relatively costly and/or may result in a relatively large package.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Technologies described herein generally relate to wavelength division multiplexer (WDM) arrays.

In an example embodiment, a WDM array includes an optical filter, N common ports, N reflection ports, and N pass ports. The N common ports may be positioned to a first side of the optical filter. N may be greater than or equal to two. The N reflection ports may be positioned to the first side of the optical filter. The N pass ports may be positioned to a second side of the optical filter opposite the first side.

In another example embodiment, a WDM array includes a thin film filter, N common ports, N reflection ports, and N pass ports. The N common ports may be positioned to a first side of the thin film filter. N may be greater than or equal to two. The N common ports may each include an optical fiber and a microlens positioned between the thin film filter and the optical fiber of the corresponding common port. The N reflection ports may be positioned to the first side of the thin film filter. The N reflection ports may each include an optical fiber and a microlens positioned between the thin film filter and the optical fiber of the corresponding reflection port. The N pass ports may be positioned to a second side of the thin film filter opposite the first side. The N pass ports may each include an optical fiber and a microlens positioned between the thin film filter and the optical fiber of the corresponding pass port.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Embodiments described herein generally relate to wavelength division multiplexer (WDM) arrays. An example WDM array may include an optical filter, N common ports, N reflection ports, and N pass ports. The N common ports and the N reflection ports may be positioned on a first side of the optical filter, while the N pass ports may be positioned on a second side of the optical filter opposite the first side. Various configurations of the optical filter, the N common ports, the N reflection ports, and the N pass ports are described herein.

The WDM arrays described herein may be used in a variety of applications. By way of example, a WDM array may be used together with an optical time domain reflectometer (OTDR) in an optical network monitor application.

Alternately or additionally, embodiments of the WDM arrays described herein may be relatively less costly and/or relatively smaller than conventional systems and devices that provide equivalent functionality.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1A:
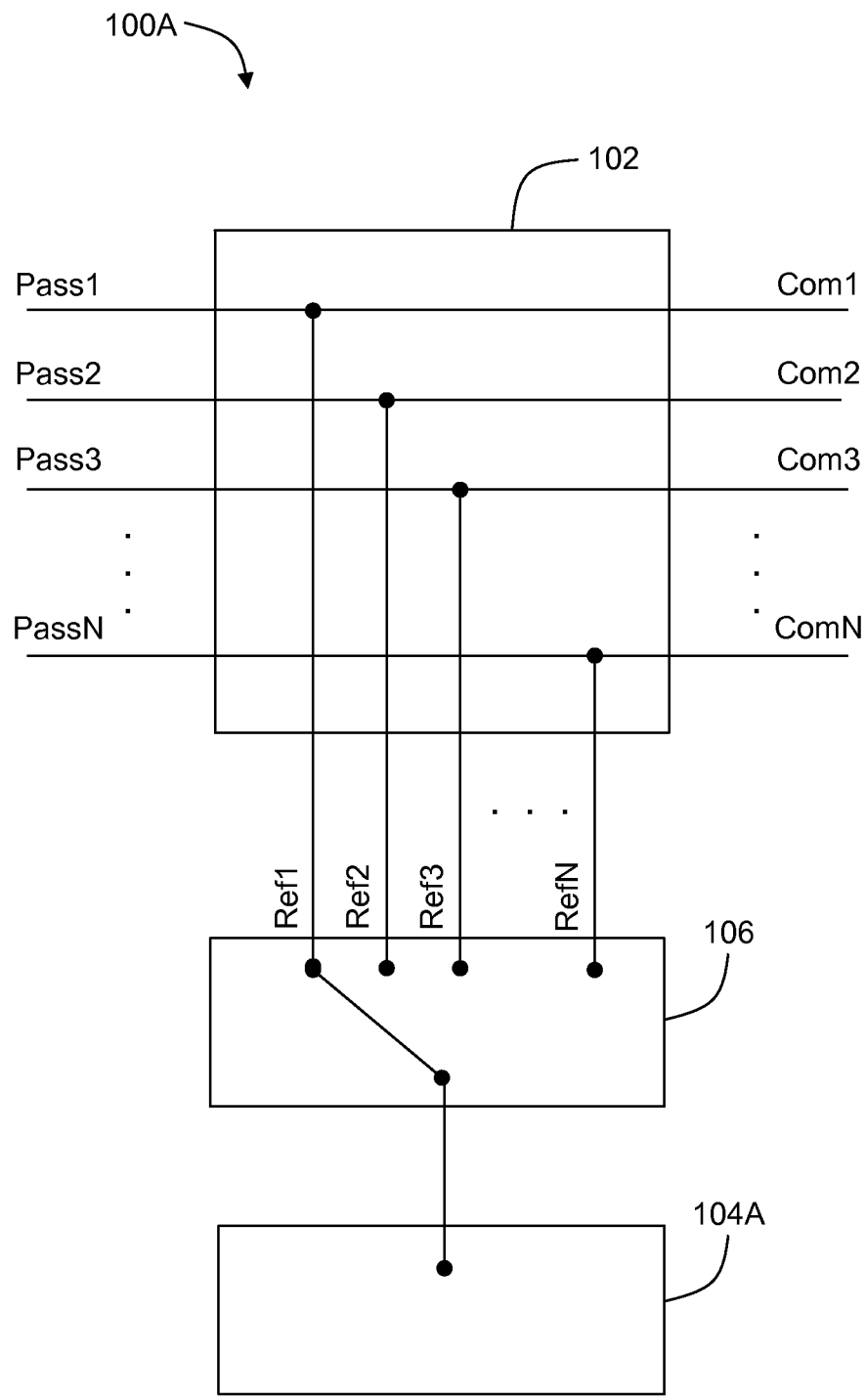
FIGS. 1A-1B illustrate example applications in which embodiments of a WDM array may be implemented.
Figure 1B:
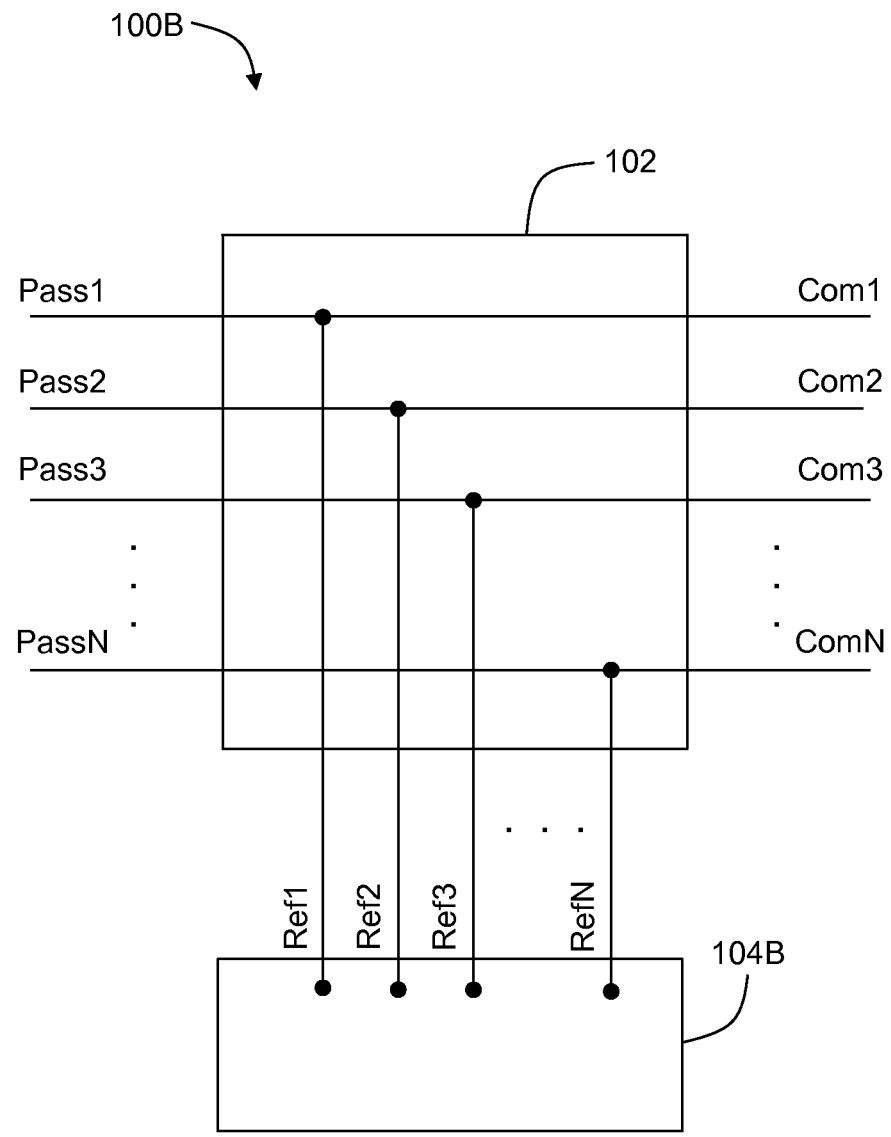

FIGS. 1A-1B illustrate example applications 100A, 100B in which embodiments of a WDM array 102 may be implemented, arranged in accordance with at least some embodiments described herein. The applications 100A, 100B may include optical network monitor applications. Each of the applications 100A, 100B of FIGS. 1A-1B includes the WDM array 102 and an OTDR 104A (FIG. 1A)

or 104B (FIG. 1B). The application 100A of FIG. 1A further includes a 1×N optical switch 106 (hereinafter "optical switch 106").

As illustrated in FIGS. 1A-1B, the WDM array 102 includes N common ports Com1-ComN, N reflection ports Ref1-RefN, and N pass ports Pass1-PassN. In this and other embodiments described herein, N may be an integer greater than or equal to two. Although not illustrated in FIGS. 1A-1B, the WDM array 102 may additionally include an optical filter. In general, the N common ports Com1-ComN and the N reflection ports Ref1-RefN may be positioned to one side of the optical filter, while the N pass ports Pass1-PassN may be positioned to the opposite side of the optical filter.

The optical filter may include a thin film filter, such as a glass-coated dielectric thin film filter. In general, the optical filter may be configured to separate relatively longer wavelengths of light from relatively shorter wavelengths of light by transmitting (or reflecting) the relatively longer wavelengths of light and reflecting (or transmitting) the relatively shorter wavelengths of light.

In operation, an outbound data signal from, e.g., a central office in a passive optical network (PON), may be received at the WDM array 102 on one or more of the N pass ports Pass1-PassN, while an outbound monitoring signal from the OTDR 104A or 104B may be received on one or more of the N reflection ports Ref1-RefN. The WDM array 102 may be configured to multiplex the outbound data signal received on a corresponding one of the N pass ports Pass1-PassN with the outbound monitoring signal received on a corresponding one of the N reflection ports Ref1-RefN to generate an outbound multiplexed signal that is transmitted from a corresponding one of the N common ports Com1-ComN downstream to, e.g., a corresponding optical network unit (ONU).

Alternately or additionally, an inbound multiplexed signal from, e.g., a corresponding ONU, may be received at the WDM array 102 on one or more of the N common ports Com1-ComN. The WDM array 102 may be configured to demultiplex the inbound multiplexed signal into a corresponding inbound data signal and a corresponding inbound monitoring signal. Each inbound data signal may be transmitted from a corresponding one of the N pass ports Pass1-PassN upstream to, e.g., the central office of the PON. In the example of FIG. 1A, each inbound monitoring signal may be transmitted from a corresponding one of the N reflection ports Ref1-RefN to the OTDR 104A via the optical switch 106. In the example of FIG. 1B, each inbound monitoring signal may be transmitted from a corresponding one of the N reflection ports Ref1-RefN to the OTDR 104B. In these and other embodiments, each inbound data signal may have a wavelength(s) in a range from 1260-1580 nanometers (nm), while each inbound monitoring signal may have a wavelength(s) in a range from 1615-1660 nm. The foregoing wavelength ranges are provided by way of example only and should not be construed as limiting.

In general, each of the OTDRs 104A, 104B may be configured to characterize optical channels, e.g., optical fibers. For instance, in the configurations of FIGS. 1A-1B, the OTDRs 104A, 104B may be configured to characterize downstream optical channels in the PON network, such as the optical fiber or fibers that function as waveguides for the outbound and/or inbound multiplexed signals between the WDM array 102 and one or more downstream ONUs in the PON. The OTDRs 104A, 104B may be configured to, for example, inject an outbound monitoring signal made up of a series of optical pulses into the optical channel under test, and to receive an inbound monitoring signal made up of light that is scattered (e.g., Rayleigh backscatter) or reflected back from points along the optical channel. The optical power of the inbound optical signal may be measured and integrated as a function of time and may be plotted as a function of optical channel length as a way of characterizing the optical channel.

In the embodiment of FIG. 1A, the OTDR 104A may be a single-channel OTDR. As such, the optical switch 106 may be configured to switch the input/output of the OTDR 104A between the various reflection ports of the WDM array 102. For example, in FIG. 1A, the OTDR 104A is illustrated as being optically coupled to the reflection port Ref1 by the optical switch 106. In these and other embodiments, the OTDR 104A may be configured to monitor a single optical channel at a time depending on which of the N reflection ports Ref1-RefN the OTDR 104A is connected to by the optical switch 106.

In the embodiment of FIG. 1B, the OTDR 104B may be a multi-channel OTDR. In these and other embodiments, the OTDR 104B may be configured to simultaneously monitor multiple optical channels. Alternately or additionally, the OTDR 104B may be configured to selectively monitor a single optical channel at a time.

Figure 2:
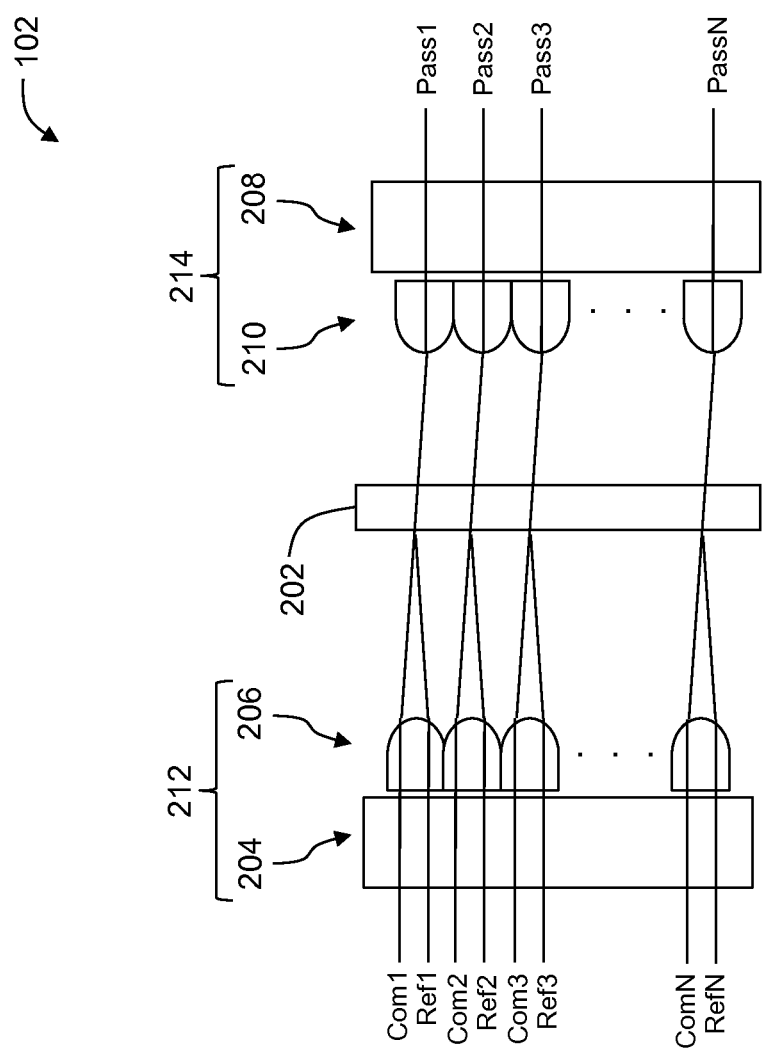
FIG. 2 illustrates a first example embodiment of a WDM array that may be implemented in the applications of FIGS. 1A-1B.

FIG. 2 illustrates a first example embodiment of the WDM array 102 of FIGS. 1A-1B. In the illustrated embodiment, the WDM array 102 includes an optical filter 202, N common ports (e.g., Com1-ComN), N reflection ports (e.g., Ref1-RefN), and N pass ports (e.g., Pass1-PassN). The N common ports and the N reflection ports are positioned to a first side of the optical filter 202, while the N pass ports are positioned to a second side of the optical filter 202 opposite the first side.

The optical filter 202 may include a thin film filter, such as a glass-coated dielectric thin film filter. Additionally, the optical filter 202 may generally be configured to separate relatively longer wavelengths of light from relatively shorter wavelengths of light by transmission of one and reflection of the other. For example, incoming optical signals on the N common ports of the WDM array 102 of FIG. 2 may each include a multiplexed signal made up of a data signal and a monitoring signal. The data signals may each be in a wavelength range within a transmission spectrum of the optical filter 202 such that each of the data signals passes through the optical filter 202 from a corresponding one of the N common ports to a corresponding one of the N pass ports. Additionally, the monitoring signals may each be in a wavelength range within a reflection spectrum of the optical filter 202 such that each of the monitoring signals is reflected by the optical filter 202 from a corresponding one of the N common ports to a corresponding one of the N reflection ports.

Accordingly, and as illustrated in FIG. 2, the N common ports and the N reflection ports are positioned with respect to the optical filter 202 such that N reflection paths are defined, each of the N reflection paths extending from a corresponding one of the N common ports to the optical filter 202 and to a corresponding one of the N reflection ports. For example, one reflection path is defined from the Com1 common port to the optical filter 202 and back to the Ref1 reflection port, another reflection path is defined from the Com2 common port to the optical filter 202 and back to the Ref2 reflection port, and so on.

Additionally, and as further illustrated in FIG. 2, the N common ports and the N pass ports are positioned with respect to the optical filter 202 such that N through paths are defined, each of the N through paths extending from a corresponding one of the N common ports through the optical filter 202 and to a corresponding one of the N pass ports. For example, one through path is defined from the Com1 common port through the optical filter 202 and to the Pass1 pass port, another through path is defined from the Com2 common port through the optical filter 202 and to the Pass2 pass port, and so on.

With continued reference to FIG. 2, the N common ports and the N reflection ports collectively include an array 204 of 2N optical fibers and an array 206 of N microlenses positioned between the array 204 of 2N optical fibers and the optical filter 202. The N pass ports include an array 208 of N optical fibers and an array 210 of N microlenses positioned between the array 208 of N optical fibers and the optical filter 202.

The N common ports and the N reflection ports may be arranged in a linear array 212 of 2N ports in which the N common ports alternate with the N reflection ports. In some embodiments, each of the 2N ports in the linear array 212 of 2N ports includes a corresponding optical fiber from the array 204 of 2N optical fibers and a corresponding microlens from the array 206 of N microlenses. Because there are twice as many optical fibers in the array 204 of 2N optical fibers as there are microlenses in the array 206 of N microlenses, each microlens in the array 206 of N microlenses may be shared by two optical fibers in the array 204 of 2N optical fibers 204. For example, the first or top microlens in the array 206 of N microlenses may be shared by the first two or top two optical fibers in the array 204 of 2N optical fibers such that the first or top microlens in the array 206 of N microlenses is part of both the Com1 common port and the Ref1 reflection port where the N common ports alternate with the N reflection ports as illustrated in FIG. 2. The 2N ports in the linear array 212 of 2N ports of FIG. 2 may be spaced at a first pitch. The first pitch may be about 127 micrometers (μm), such as 127 μm±1 μm. Alternately, the first pitch may be greater or less than about 127 μm.

The N pass ports may be arranged in a linear array 214 of N ports. In some embodiments, each of the N ports in the linear array 214 of N ports includes a corresponding optical fiber from the array 208 of N optical fibers and a corresponding microlens from the array 210 of N microlenses. The N ports in the linear array 214 of N ports of FIG. 2 may be spaced at a second pitch substantially equal to two times the first pitch. The second pitch may be about 254 μm, such as 254 μm±1 μm. Alternately, the second pitch may be greater or less than about 254 μm.

Figure 3A:
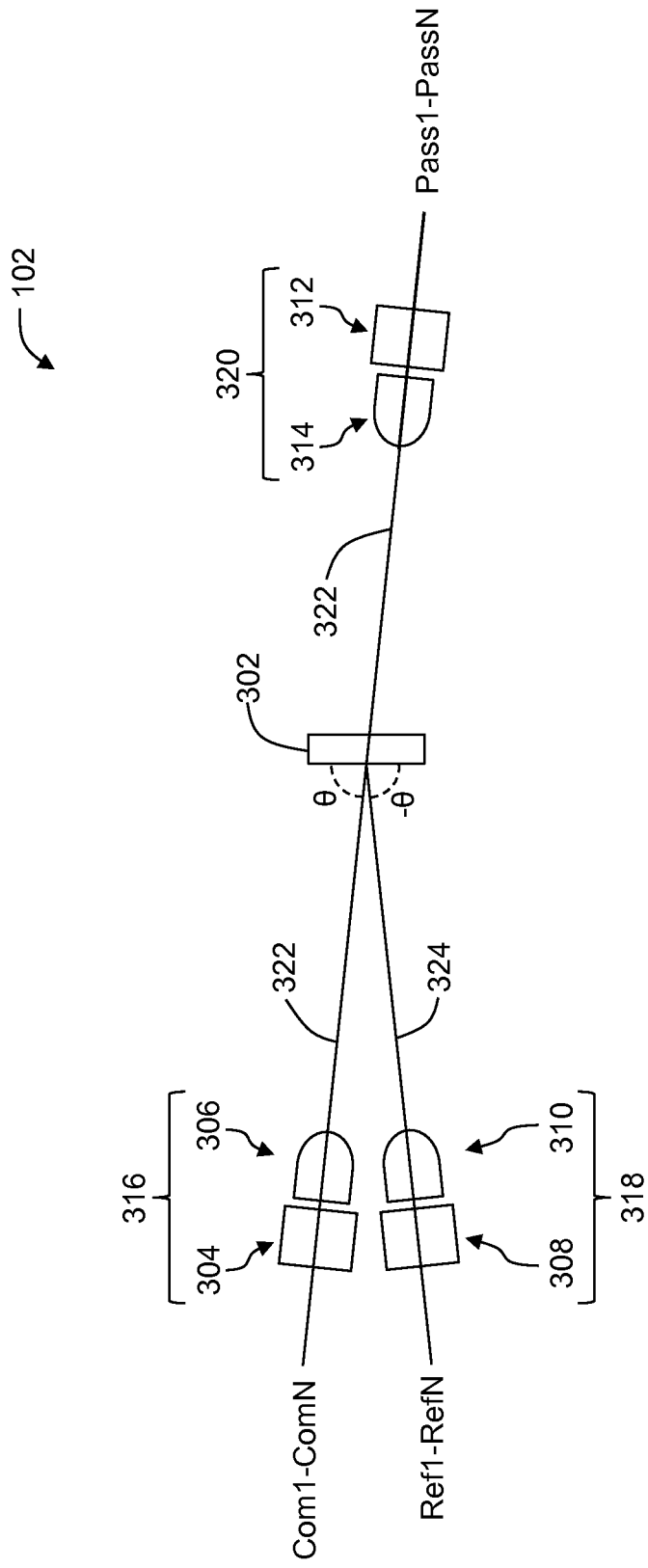
FIGS. 3A-3B illustrate a second example embodiment of a WDM array that may be implemented in the applications of FIGS. 1A-1B.
Figure 3B:
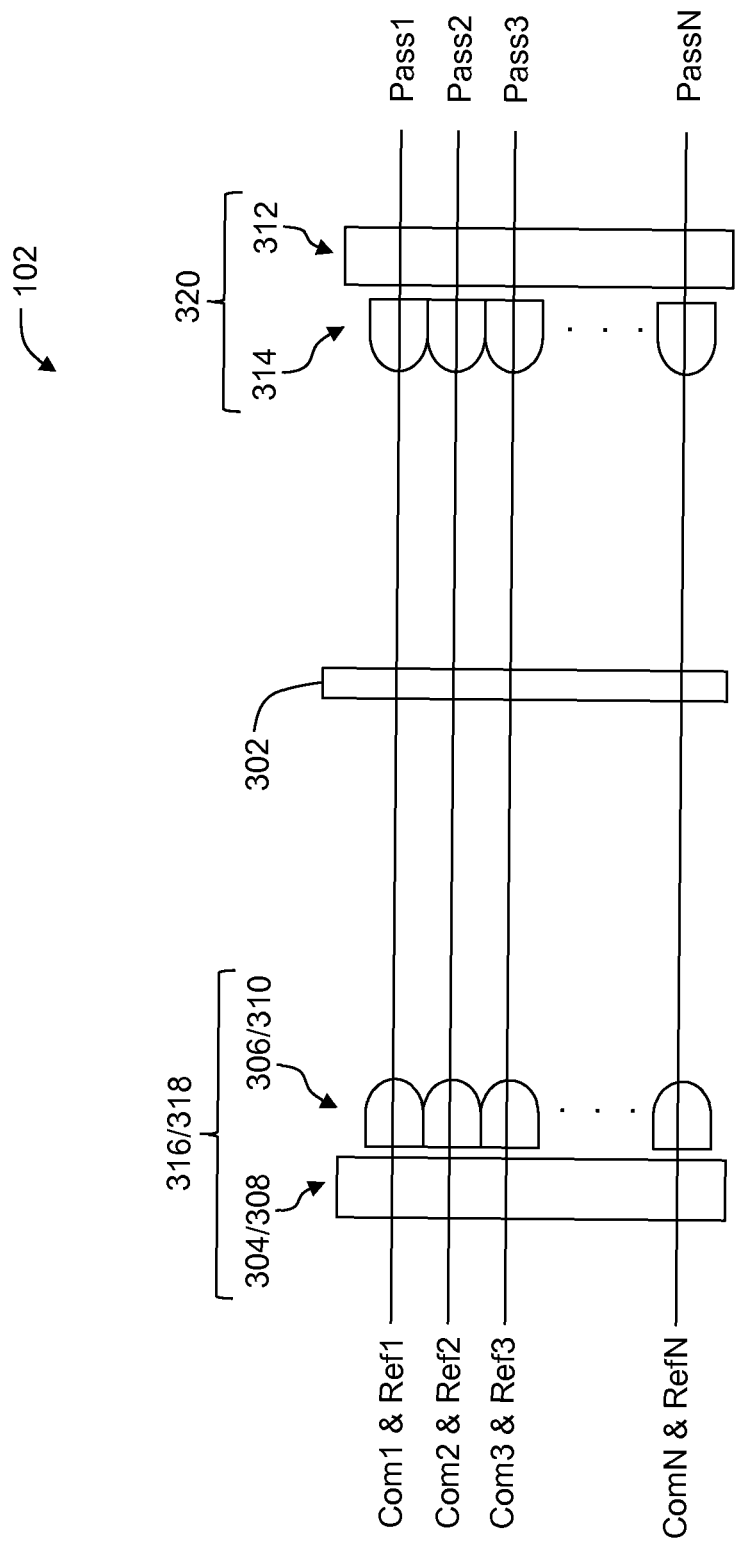

FIGS. 3A-3B illustrate a second example embodiment of the WDM array 102 of FIGS. 1A-1B. In particular, FIG. 3A is an overhead view and FIG. 3B is a side view. In the illustrated embodiment, the WDM array 102 includes an optical filter 302, N common ports (e.g., Com1-ComN), N reflection ports (e.g., Ref1-RefN), and N pass ports (e.g., Pass1-PassN). The N common ports and the N reflection ports are positioned to a first side of the optical filter 302, while the N pass ports are positioned to a second side of the optical filter 302 opposite the first side.

The optical filter 302 may be similar or identical to the optical filter 202 of FIG. 2 and is not described in further detail herein.

As in FIG. 2, in FIGS. 3A-3B, the N common ports and the N reflection ports are positioned with respect to the optical filter 302 such that N reflection paths are defined, each of the N reflection paths extending from a corresponding one of the N common ports to the optical filter 302 and to a corresponding one of the N reflection ports. For example, one reflection path is defined from the Com1 common port to the optical filter 302 and back to the Ref1 reflection port, another reflection path is defined from the Com2 common port to the optical filter 302 and back to the Ref2 reflection port, and so on.

Additionally, and as further illustrated in FIGS. 3A-3B, the N common ports and the N pass ports are positioned with respect to the optical filter 302 such that N through paths are defined, each of the N through paths extending from a corresponding one of the N common ports through the optical filter 302 and to a corresponding one of the N pass ports. For example, one through path is defined from the Com1 common port through the optical filter 302 and to the Pass1 pass port, another through path is defined from the Com2 common port through the optical filter 302 and to the Pass2 pass port, and so on.

As perhaps best seen in the overhead view of FIG. 3A, the N common ports may include a first array 304 of N optical fibers and a first array 306 of N microlenses positioned between the first array 304 of N optical fibers and the optical filter 302. Similarly, the N reflection ports may include a second array 308 of N optical fibers and a second array 310 of N microlenses positioned between the second array 308 of N optical fibers and the optical filter 302. Similarly, the N pass ports may include a third array 312 of N optical fibers and a third array 314 of N microlenses positioned between the third array 312 of N optical fibers and the optical filter 302.

The N common ports may be arranged in a linear array 316 of N common ports. The N reflection ports may be arranged in a linear array 318 of N reflection ports. The N pass ports may be arranged in a linear array 320 of N pass ports.

Referring to FIG. 3A, the linear array 316 of N common ports and the linear array 320 of N pass ports may define a first plane 322 that intersects the optical filter 302 along an intersecting line (not shown). The first plane 322 may be oriented at an angle θ relative to a plane of the optical filter. The linear array 318 of N reflection ports and the intersecting line may define a second plane 324 oriented at an angle −θ relative to the plane of the optical filter 302.

Figure 4:
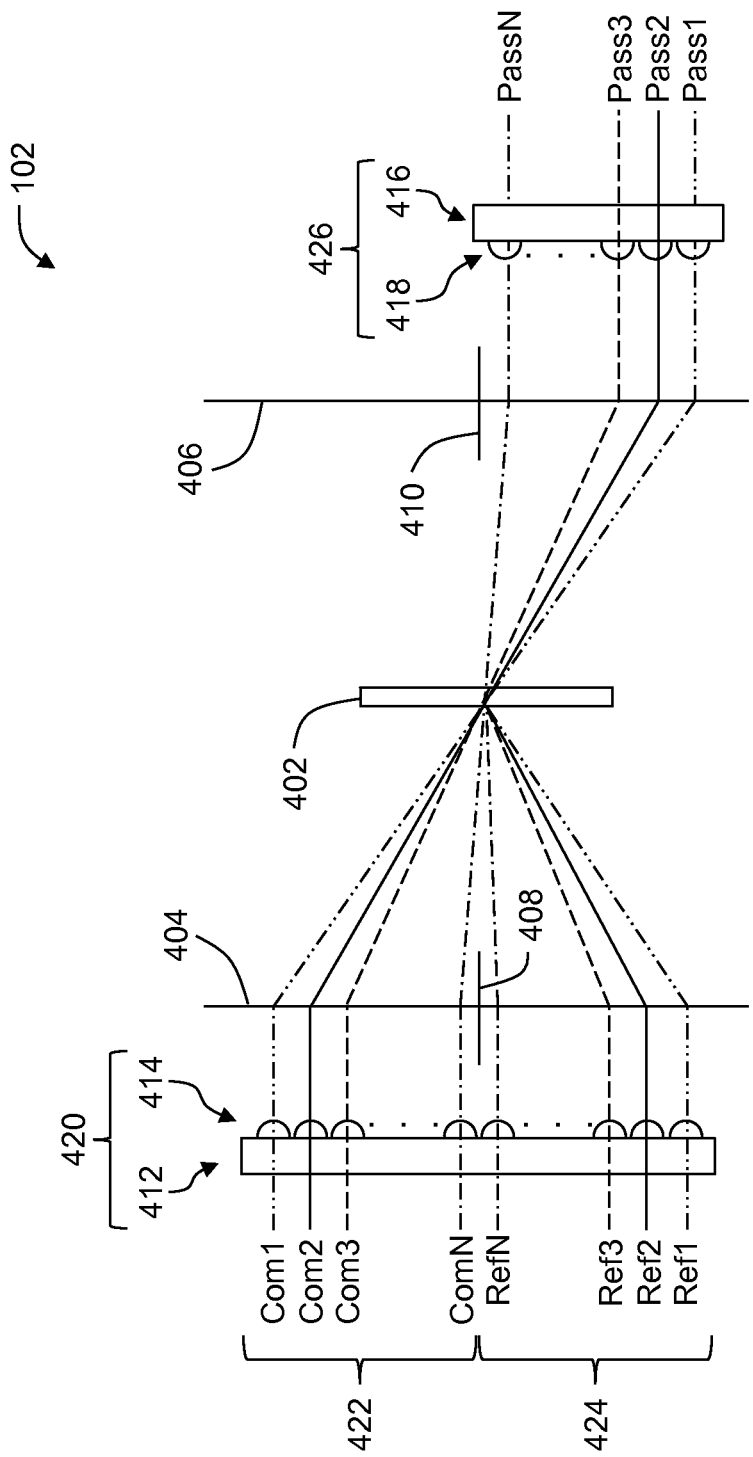
FIG. 4 illustrates a third example embodiment of a WDM array that may be implemented in the applications of FIGS. 1A-1B.

FIG. 4 illustrates a third example embodiment of the WDM array 102 of FIGS. 1A-1B. In the illustrated embodiment, the WDM array 102 includes an optical filter 402, N common ports (e.g., Com1-ComN), N reflection ports (e.g., Ref1-RefN), N pass ports (e.g., Pass1-PassN), a first converging lens 404, and a second converging lens 406. The N common ports and the N reflection ports are positioned to a first side of the optical filter 402, while the N pass ports are positioned to a second side of the optical filter 402 opposite the first side.

The optical filter 402 may generally be similar or identical to the optical filters 202, 302 of FIGS. 2-3B and reference may be made to the above description. Alternately, the optical filter 402 may be relatively smaller than the optical filters 202, 302 implemented in the embodiments of FIGS. 2-3B since incoming signals from the N common ports may be incident on the optical filter 402 at a common location.

As in FIGS. 2-3B, in FIG. 4, the N common ports and the N reflection ports are positioned with respect to the optical filter 402 such that N reflection paths are defined, each of the N reflection paths extending from a corresponding one of the N common ports to the optical filter 402 and to a corresponding one of the N reflection ports. For example, one reflection path is defined from the Com1 common port to the optical filter 402 and back to the Ref1 reflection port, another reflection path is defined from the Com2 common port to the optical filter 402 and back to the Ref2 reflection port, and so on.

Additionally, and as further illustrated in FIG. 4, the N common ports and the N pass ports are positioned with respect to the optical filter 402 such that N through paths are defined, each of the N through paths extending from a corresponding one of the N common ports through the optical filter 402 and to a corresponding one of the N pass ports. For example, one through path is defined from the Com1 common port through the optical filter 402 and to the Pass1 pass port, another through path is defined from the Com2 common port through the optical filter 402 and to the Pass2 pass port, and so on.

Whereas each of the N common ports is part of both a reflection path and a through path, the reflection path and through path that share a common port may be said to be associated. To visualize each associated reflection path and through path, different line patterns have been used in FIG. 4 for each associated reflection path and through path. For example, a dash-dot-dot line pattern is used for the associated reflection path and through path that share the Com1 common port, a solid line pattern is used for the associated reflection path and through path that share the Com2 common port, a dash line pattern is used for the associated reflection path and through path that share the Com3 common port, and a dash-dot line pattern is used for the associated reflection path and through path that share the ComN common port.

With continued reference to FIG. 4, the first converging lens 404 may be configured to bend incoming signals from the N common ports towards the optical filter 402 such that all incoming signals from the N common ports are incident on the optical filter 402 substantially at a common location. The first converging lens 404 may be further configured to bend a reflected portion of each of the incoming signals towards the reflection ports. In this and other embodiments, a distance of a point on the first converging lens 404 at which each incoming signal or reflected portion is incident on the first converging lens 404 from a lens axis 408 of the first converging lens 404 may determine how much the incoming signal or reflected portion is bent.

The second converging lens 406 may be configured to bend a transmitted portion of each of the incoming signals towards the pass ports. In this and other embodiments, a distance of a point on the second converging lens 406 at which each transmitted portion is incident on the second converging lens 406 from a lens axis 410 of the second converging lens 406 may determine how much the transmitted portion is bent.

As illustrated in FIG. 4, the N common ports and the N reflection ports collectively include an array 412 of 2N optical fibers and an array 414 of 2N microlenses positioned between the array 412 of 2N optical fibers and the optical filter 402. Alternately or additionally, the N common ports may include a first array of N optical fibers and a first array of N microlenses positioned between the first array of N optical fibers and the optical filter 402, while the N reflection ports may include a second array of N optical fibers and a second array of N microlenses positioned between the second array of N optical fibers and the optical filter 402. The second array of N optical fibers and the second array of N microlenses may be arranged in line with, respectively, the first array of N optical fibers and the first array of N microlenses, or the second array of N optical fibers and the second array of N microlenses may be arranged parallel to but not in line with, respectively, the first array of N optical fibers and the first array of N microlenses. The N pass ports include an array 416 of N optical fibers and an array 418 of N microlenses positioned between the array 416 of N optical fibers and the optical filter 402.

The N common ports and the N reflection ports may be arranged in a linear array 420 of 2N ports, or in a first linear array of N ports and a second linear array of N ports arranged in line and/or parallel with the first linear array of N ports. In some embodiments, each of the 2N ports in the linear array 420 of 2N ports includes a corresponding optical fiber from the array 412 of 2N optical fibers and a corresponding microlens from the array 414 of 2N microlenses. The N common ports may be aligned in sequence in a first portion 422 of the linear array 420 of 2N ports. The N reflection ports may be aligned in sequence in a second portion 424 of the linear array 420 of 2N ports. Accordingly, the second portion 424 of the linear array 420 of 2N ports may be aligned in sequence with the first portion 422 of the linear array 420 of 2N ports.

The N pass ports may be arranged in a linear array 426 of N ports. In some embodiments, each of the N ports in the linear array 426 of N ports includes a corresponding optical fiber from the array 416 of N optical fibers and a corresponding microlens from the array 418 of N microlenses. The N ports in the linear array 426 of N ports of FIG. 4 may be spaced at the same pitch as the 2N ports of the linear array 420 of 2N ports. For instance, the N ports in the linear array 426 of N ports and the 2N ports in the linear array 420 of 2N ports may be spaced at a pitch of about 254 μm, such as 254 μm±1 μm. Alternately, the pitch may be greater or less than about 254 μm. Alternately, the N ports in the linear array 426 of N ports of FIG. 4 may be spaced at a different pitch than the 2N ports of the linear array 420 of 2N ports with suitable reconfiguration of the relative locations of the components of the WDM array 102 of FIG. 4.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wavelength division multiplexer (WDM) array, the WDM array comprising:
   an optical filter;
   N common ports positioned to a first side of the optical filter, wherein N is greater than or equal to two;
   N reflection ports positioned to the first side of the optical filter; and
   N pass ports positioned to a second side of the optical filter opposite the first side;
   wherein the N common ports and N pass ports define a first plane that intersects the optical filter along an intersecting line and the first plane is oriented at an acute, non-zero angle θ relative to a plane of the optical filter.

2. The WDM array of claim 1, wherein the N common ports, the optical filter, and the N reflection ports define N reflection paths, each of the N reflection paths extending from a corresponding one of the N common ports to the optical filter and from the optical filter to a corresponding one of the N reflection ports.

3. The WDM array of claim 1, wherein the N common ports, the optical filter, and the N pass ports define N through paths, each of the N through paths extending from a corresponding one of the N common ports through the optical filter and to a corresponding one of the N pass ports.

4. The WDM array of claim 1, wherein the optical filter comprises a thin film filter.

5. The WDM array of claim 1, wherein:
the N common ports and the N reflection ports collectively comprise an array of 2N optical fibers and an array of N microlenses positioned between the array of 2N optical fibers and the optical filter;
the N pass ports comprise an array of N optical fibers and an array of N microlenses positioned between the array of N optical fibers and the optical filter;
the N common ports and the N reflection ports are arranged in a linear array of 2N ports spaced at a first pitch, each of the 2N ports including a corresponding optical fiber from the array of 2N optical fibers and a corresponding microlens from the array of N microlenses;
the N common ports alternate with the N reflection ports in the linear array of 2N ports; and
the N pass ports are arranged in a linear array of N ports spaced at a second pitch equal to two times the first pitch, each of the N ports including a corresponding optical fiber from the array of N optical fibers and a corresponding microlens from the array of N microlenses.

6. The WDM array of claim 5, wherein the first pitch is about 127 micrometers (μm) and the second pitch is about 254 μm.

7. The WDM array of claim 1, wherein:
the N common ports comprise a first array of N optical fibers and a first array of N microlenses positioned between the first array of N optical fibers and the optical filter;
the N reflection ports comprise a second array of N optical fibers and a second array of N microlenses positioned between the second array of N optical fibers and the optical filter; and
the N pass ports comprise a third array of N optical fibers and a third array of N microlenses positioned between the third array of N optical fibers and the optical filter.

8. The WDM array of claim 7, wherein:
the N common ports are arranged in a linear array of N common ports;
the N reflection ports are arranged in a linear array of N reflection ports;
the N pass ports are arranged in a linear array of N pass ports;
the linear array of N reflection ports and the intersecting line define a second plane oriented at an angle −θ relative to the plane of the optical filter.

9. The WDM array of claim 1, further comprising:
a first converging lens positioned between the optical filter and the N common ports and further positioned between the optical filter and the N reflection ports; and
a second converging lens positioned between the optical filter and the N pass ports.

10. The WDM array of claim 9, wherein:
the N common ports and the N reflection ports are arranged in a linear array of 2N ports spaced at a first pitch, each of the 2N ports including a corresponding optical fiber from an array of 2N optical fibers and a corresponding microlens from an array of 2N microlenses;
the N common ports are aligned in sequence in a first portion of the linear array of 2N ports;

the N reflection ports are aligned in sequence in a second portion of the linear array of 2N ports, the second portion of the linear array of 2N ports being aligned in sequence with the first portion of the linear array of 2N ports; and
the N pass ports are arranged in a linear array of N ports spaced at the first pitch, each of the N ports including a corresponding optical fiber from the array of N optical fibers and a corresponding microlens from the array of N microlenses.

11. A wavelength division multiplexer (WDM) array, the WDM array comprising:
a thin film filter;
N common ports positioned to a first side of the thin film filter, wherein N is greater than or equal to two and wherein the N common ports each comprise an optical fiber and a microlens positioned between the thin film filter and the optical fiber of the corresponding common port;
N reflection ports positioned to the first side of the thin film filter, wherein the N reflection ports each comprise an optical fiber and a microlens positioned between the thin film filter and the optical fiber of the corresponding reflection port; and
N pass ports positioned to a second side of the thin film filter opposite the first side, wherein the N pass ports each comprise an optical fiber and a microlens positioned between the thin film filter and the optical fiber of the corresponding pass port;
wherein the N common ports and N pass ports define a first plane that intersects the thin film filter along an intersecting line and the first plane is oriented at an acute, non-zero angle θ relative to a plane of the thin film filter.

12. The WDM array of claim 11, wherein the N common ports, the thin film filter, and the N reflection ports define N reflection paths, each of the N reflection paths extending from a corresponding one of the N common ports to the thin film filter and from the thin film filter to a corresponding one of the N reflection ports.

13. The WDM array of claim 11, wherein the N common ports, the thin film filter, and the N pass ports define N through paths, each of the N through paths extending from a corresponding one of the N common ports through the thin film filter and to a corresponding one of the N pass ports.

14. The WDM array of claim 11, wherein the thin film filter comprises a glass-coated dielectric thin film filter.

15. The WDM array of claim 11, wherein the N common ports and the N reflection ports are arranged in a linear array of 2N ports and the N pass ports are arranged in a linear array of N ports.

16. The WDM array of claim 15, wherein:
the N common ports alternate with the N reflection ports in the linear array of 2N ports, each of the N common ports being associated with an immediately adjacent one of the N reflection ports;
each of the N common ports has a different optical fiber than an associated one of the N reflection ports and a common microlens shared with the associated one of the N reflection ports;
ports in the array of 2N ports are spaced at a first pitch; and
ports in the array of N ports are spaced at a second pitch equal to two times the first pitch.

17. The WDM array of claim 16, wherein the first pitch is about 127 micrometers (μm) and the second pitch is about 254 μm.

18. The WDM array of claim 11, wherein: the N common ports are arranged in a linear array of N common ports;
the N reflection ports are arranged in a linear array of N reflection ports; the N pass ports are arranged in a linear array of N pass ports;
the linear array of N reflection ports and the intersecting line define a second plane oriented at an angle $-\theta$ relative to the plane of the thin film filter.

19. The WDM array of claim 11, further comprising:
a first converging lens positioned between the optical filter and the N common ports and further positioned between the optical filter and the N reflection ports; and
a second converging lens positioned between the optical filter and the N pass ports.

20. The WDM array of claim 19, wherein:
the N common ports and the N reflection ports are arranged in a linear array of 2N ports;
the N pass ports are arranged in a linear array of N ports;
ports in the array of 2N ports and ports in the array of N ports are spaced at a first pitch;
the N common ports are aligned in sequence in a first portion of the linear array of 2N ports;
the N reflection ports are aligned in sequence in a second portion of the linear array of 2N ports; and
the second portion of the linear array of 2N ports is aligned in sequence with the first portion of the linear array of 2N ports.

* * * * *